(12) United States Patent
Hinze et al.

(10) Patent No.: US 7,862,106 B2
(45) Date of Patent: Jan. 4, 2011

(54) UTILITY VEHICLES WITH AN ARMOURED CAB OF SPECIAL DESIGN

(75) Inventors: Peter Hinze, Altomünster (DE); Franz Ribo, Vienna (AU); Robert Wimmer, Dietach (AT)

(73) Assignee: MAN Nutzfahrzeuge Österreich AG, Vienna (AT)

( * ) Notice: Subject to any disclaimer, the term of this patent is extended or adjusted under 35 U.S.C. 154(b) by 302 days.

(21) Appl. No.: 12/196,976

(22) Filed: Aug. 22, 2008

(65) Prior Publication Data

US 2009/0056529 A1 Mar. 5, 2009

(30) Foreign Application Priority Data

Aug. 31, 2007 (DE) .................... 10 2007 041 276

(51) Int. Cl.
*B62D 33/00* (2006.01)
(52) U.S. Cl. .................. 296/190.05; 296/190.08; 180/89.14; 89/36.08
(58) Field of Classification Search ............ 296/190.01, 296/190.02, 190.03, 190.04, 190.05, 190.06, 296/190.08, 37.6, 24.43; 180/89.13, 89.14, 180/89.15, 89.16, 89.18; 89/36.08, 36.09
See application file for complete search history.

(56) References Cited

U.S. PATENT DOCUMENTS 7,393,045 B1 * 7/2008 Gonzalez ............... 296/190.04
7,673,931 B2 * 3/2010 Takano et al. .......... 296/190.01

* cited by examiner

*Primary Examiner*—Joseph D Pape
(74) *Attorney, Agent, or Firm*—Cohen Pontani Lieberman & Pavane LLP

(57) ABSTRACT

Utility vehicle, in particular for military purposes, with a chassis and a cab arranged on it frame so that it can be tilted, and guarded in certain places by affixed armor plating. The cab has a front module and a rear module, whereby the front module has a front wall, two side walls, a rear wall, a floor and a roof forming a cabin for the driver and co-driver. The rear module has a bearer frame enclosed at least in part by walls that form a hood-like protective and stowage space for the power aggregate and other vehicle parts and accessories. The rear module is releaseably attached to the rear of the front module and supported by it. Rear armoring of the cab is implemented by armor plating fitted between its front module and rear module.

24 Claims, 20 Drawing Sheets

UTILITY VEHICLES WITH AN ARMOURED CAB OF SPECIAL DESIGN

BACKGROUND OF THE INVENTION

1. Field of the Invention

The subject of the invention is utility vehicles, in particular for military purposes, with a chassis and a cab arranged on its frame so that it can be tilted, and guarded in certain places by affixed armour plating.

2. Description of Prior Art

In the case of utility vehicles for special purposes, also military trucks, the cab and also equipment carriers installed behind it are in very many cases matched to the intended purpose. An example is the refuse collection vehicle of patent EP 1637438 A2 with its low-entry cab and the equipment carrier arranged behind it on the chassis that in this case also assumes the function of the rear cab suspension. A military vehicle is also familiar from patent EP 1640251 A1 in which, behind the cab and spaced from the latter on a specially formed subframe, an enclosed aggregate frame is arranged that is capable of holding at least one cooling aggregate. In similar fashion, in the utility vehicle familiar from patent AT 410308 B, a number of vehicle aggregates and parts are comprised behind its cab in a supporting frame to form a compact assembly. In the case of vehicles for military purposes the cab is usually armoured to protect its occupants against enemy fire. This armouring consists of armour plates attached to the outside or inside of the cab walls. Common to all cited vehicle examples is that the cab can be tilted during repair or maintenance for access to the engine, clutch and transmission, which are partly below the cab and partly below the aggregate carrier. On the other hand the aggregate carrier in each case together with the vehicle components it carries forms a self-contained assembly separate from the cab that is firmly arranged on the frame, and furthermore is not joined to the cab in any way.

SUMMARY OF THE INVENTION

A purpose of the invention is to embody a utility vehicle, its cab and the aggregates, with components and accessories arranged behind it, so that the latter are accommodated in a space-saving and protected manner, and also to achieve effective attachment of armouring of the cab against fire from behind.

Advantageous embodiments of the inventive utility vehicle are identified in the subsidiary claims.

The inventive utility vehicle is characterized by a special two-part cab composed of a front module and a rear module. The front module forms a cabin for the driver and co-driver, while the rear module immediately behind this forms a hood-like protective and stowage space for the power aggregate and other vehicle parts and accessories such as radiator, fan, air intake pipe, air intake box and air filter, battery box, compressed air and fuel tanks, etc. The rear module is attached to the front module in a special way allowing it to be released, and is also supported by the front module. The rear armouring in the invention is not provided on the rear of the cab as usual in most cases but is implemented by armour plating fitted between its front module and rear module. This arrangement of the armour plating is made possible in the first place by the inventive division of the cab into a front module and rear module. Dividing the cab in this way allows simple attachment of the armour plates on the front module rear wall. On the one hand the rear module attached to the front module offers adequate protection for the covered and housed vehicle components and accessories in a compact arrangement. On the other hand the rear module, when the vehicle is fired at from behind, absorbs at least part of the energy of impacting missiles, the remaining energy then being taken up by the armour plates on the rear wall of the front module.

BRIEF DESCRIPTION OF THE DRAWINGS

In what follows an embodiment of the invention is explained in more detail as a military vehicle. In the drawings.

DETAILED DESCRIPTION OF THE PREFERRED EMBODIMENTS

The invention applies in general to utility vehicles with a cab arranged on the frame of a chassis so that it can be tilted. As an example of application the drawings show those sections of a military vehicle with an armoured cab that enable the invention to be understood. The armouring of the cab is only shown in the parts of the cab covered by the invention.

Figure 18:
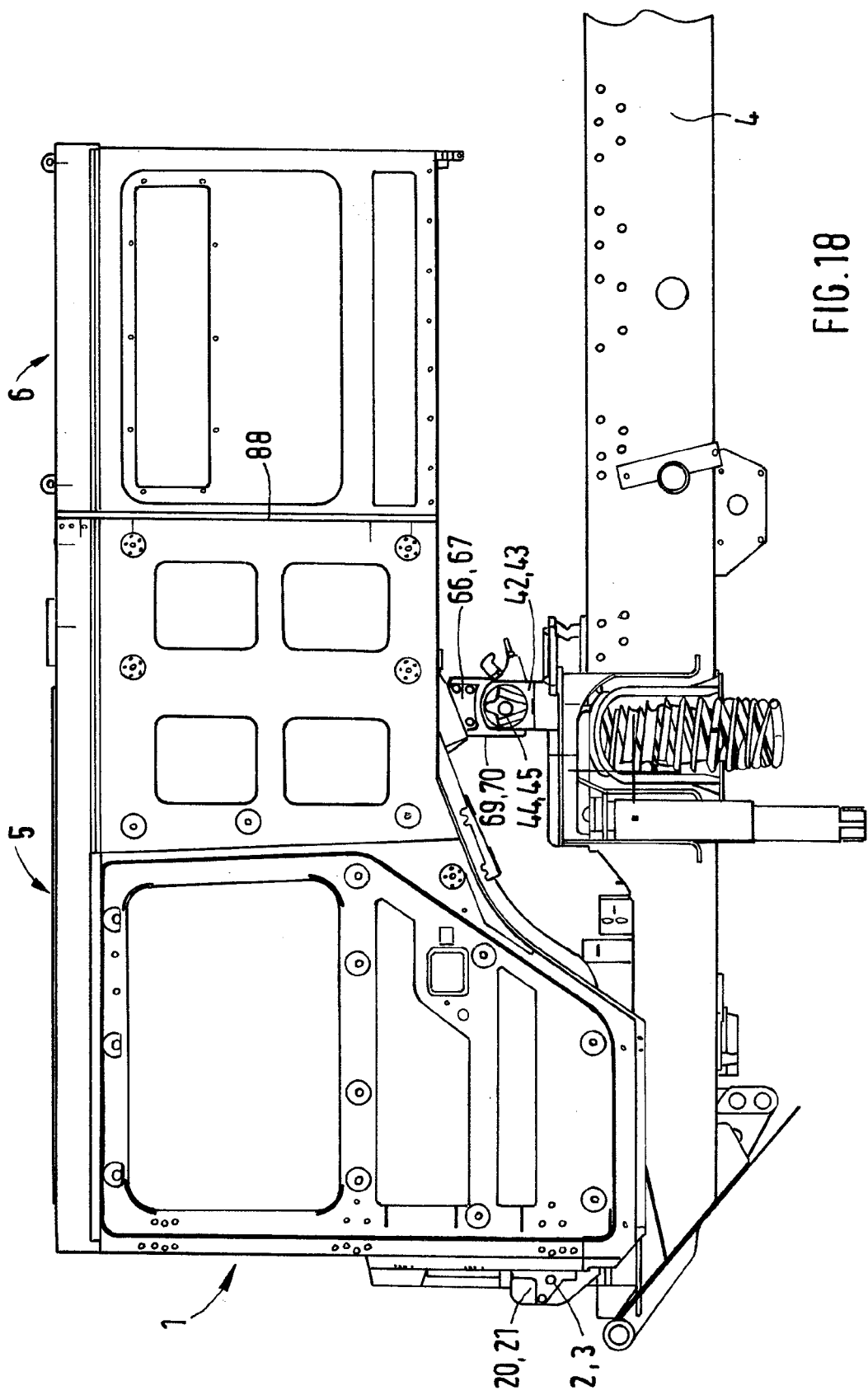
FIG. 18 depicts the inventive cab attached to the chassis frame of a utility vehicle.

Cab 1 of the utility vehicle is attached by front bearings 2, 3 and other means, not shown in detail, to the chassis frame 4, said bearings forming the axle on which the cab 1 is tilted (see FIG. 18). The chassis frame 4 consists of two frame side members joined by cross-members.

Figure 1:
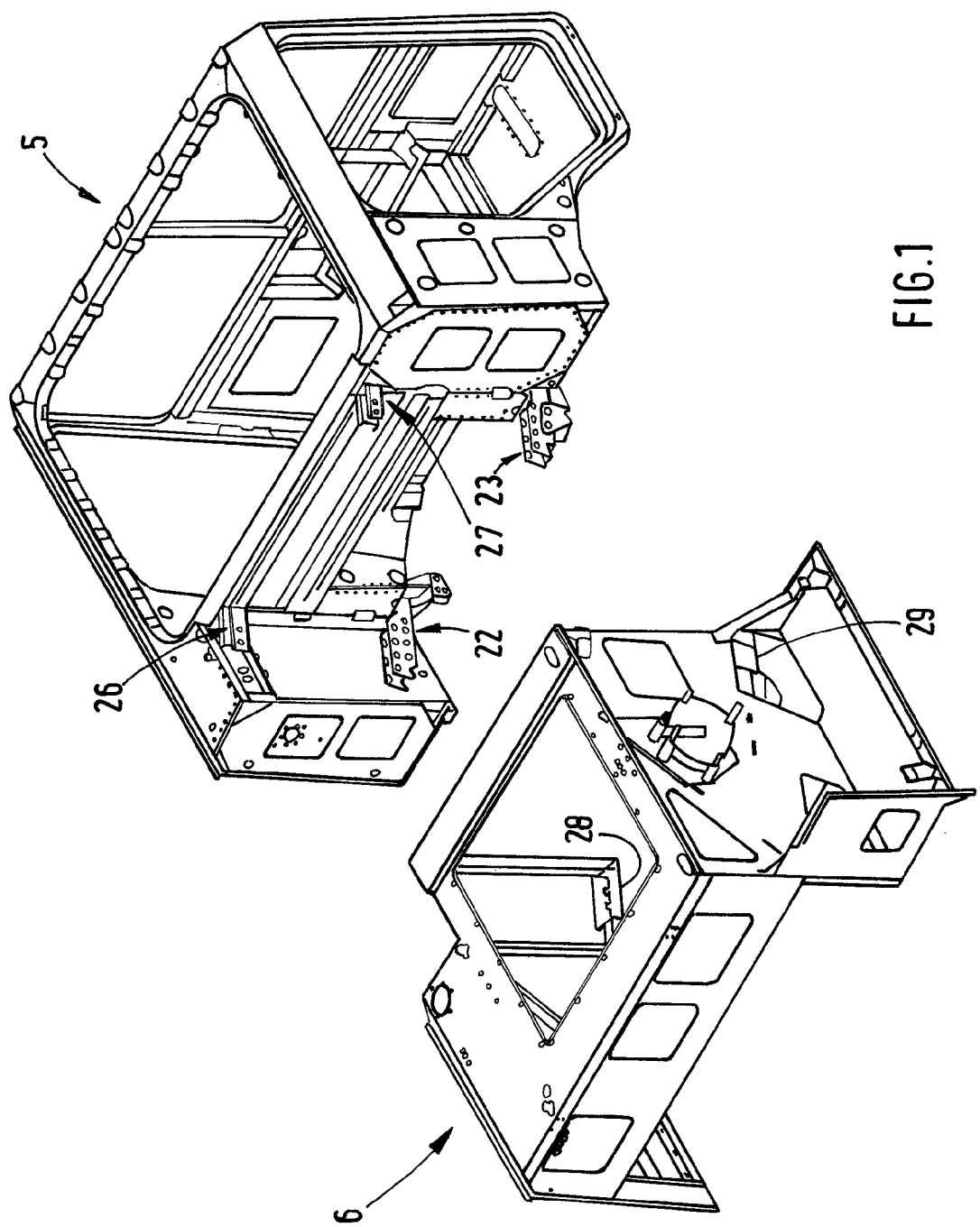
FIG. 1 is a perspective view of the inventive dual-module cab of a military vehicle as a body in white without built-on and built-in parts in an exploded perspective of the cab front module and rear module.
Figure 2:
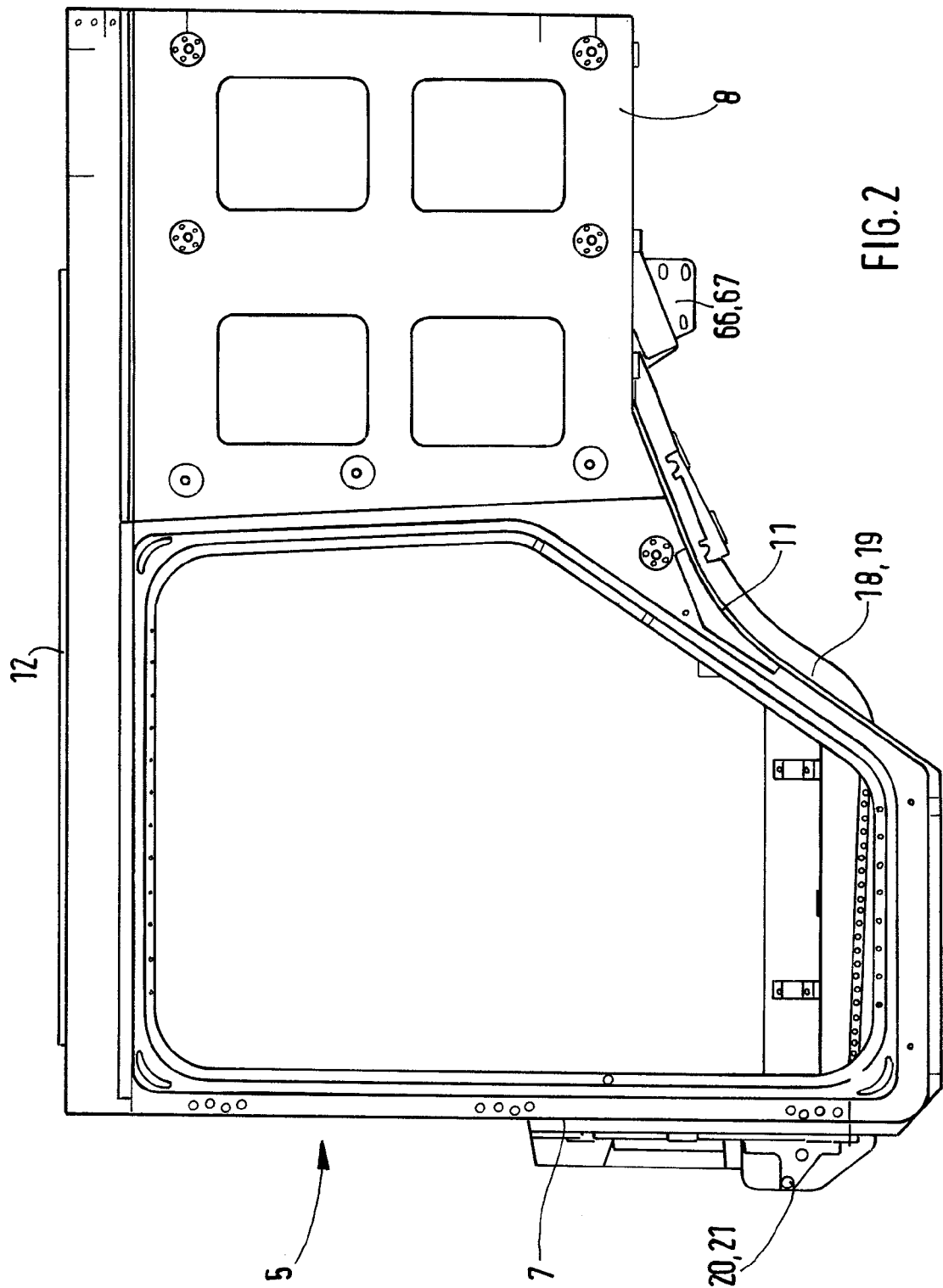
FIG. 2 depicts the cab front module of FIG. 1 from the left.
Figure 3:
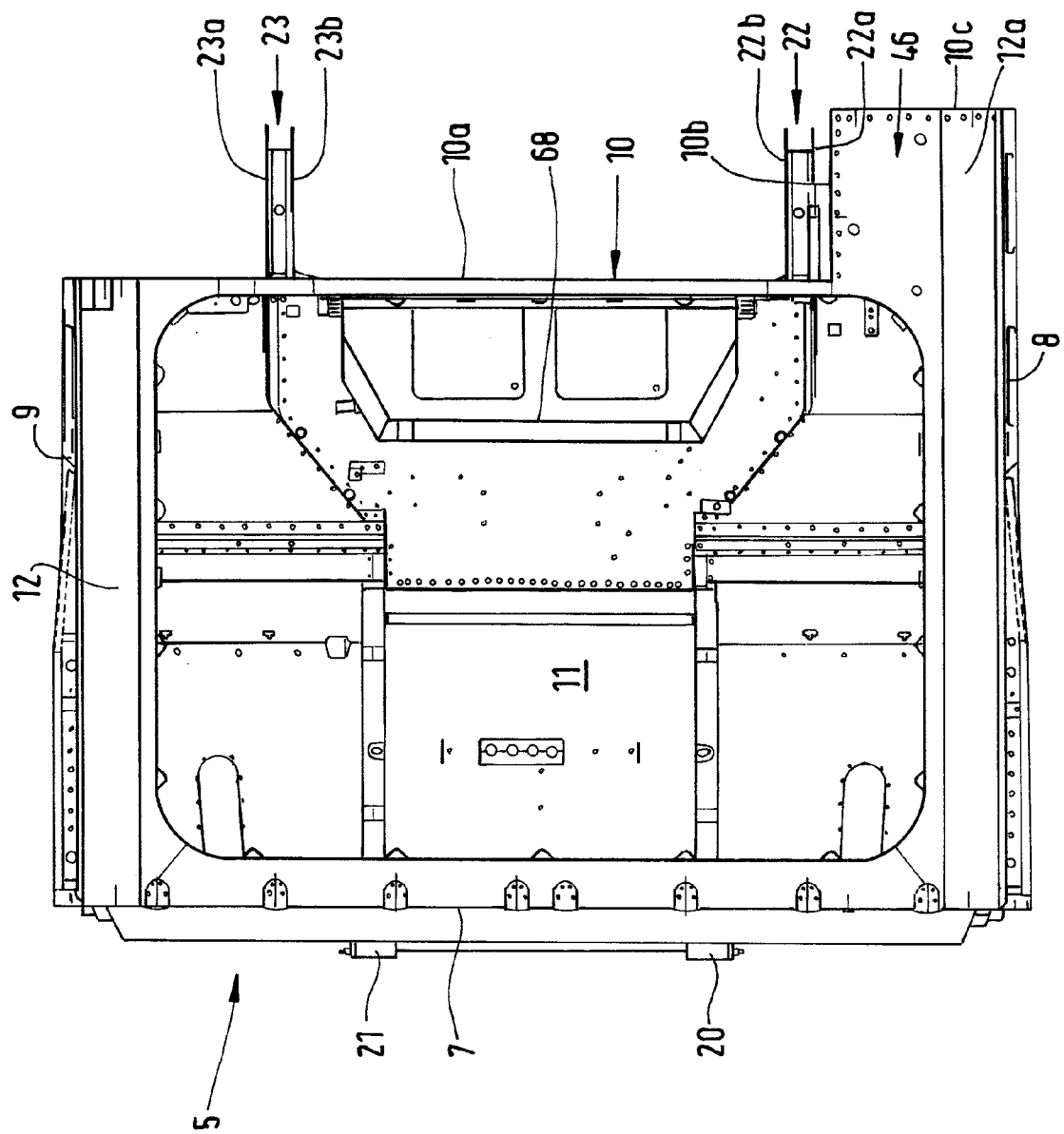
FIG. 3 depicts the cab front module of FIG. 1 in plan view.

According to the invention the cab 1 is composed of a front module 5 and a rear module 6. The details of the two cab modules 5, 6 are easy to see in FIG. 1 and, once ready assembled, in FIG. 18. What follows are details of the invention regarding the construction of the two cab modules 5, 6 and how they are joined.

The cab front module 5 exhibits a front wall 7, a left side wall 8, a right side wall 9, a rear wall 10, a floor 11 and a roof 12, and forms a self-contained cabin for the driver and co-driver. The drawing only shows the cab in white, i.e. for the sake of clarity without any built-on and built-in parts in the walls of the cab such as doors, windscreens, roof fittings, interior fixtures.

The cab rear module 6 in the example shown exhibits a bearer frame 17 enclosed by a left side wall 13, a right side wall 14 and at least in part by further walls 15, 16, and forms a hood-like protective and storage space for the power aggregate and other vehicle parts and accessories such as radiator, fan, air intake pipe, air filter, compressed air and fuel tanks, batteries, spare wheel.

According to the invention the cab rear module 6 is attached to the rear of the front module 5 in a special way and also supported by it, and may also be released.

The floor 11 of the cab front module 5 is reinforced by two longitudinal floor members 18, 19. At the front end of each of these in the illustrated example there is a case 20, 21 for a front cab bearing 2, 3, which is not shown in detail however. At its rear end each of the two longitudinal floor members 18, 19 joins a supporting bracket 22, 23 that projects beyond the front module rear wall 10. The longitudinal floor members 18, 19 with the attached supporting brackets 22, 23 function as carriers for the cab rear module 6. As reinforcement the front module rear wall 10 exhibits a framework formed of a number of spars. In the present example the two vertical spars numbered 24, 25 are of interest because they carry various front module supporting and joining means that are subsequently described in more detail. These supporting and joining means at different levels on the front module rear wall 10 match supporting and joining means at the front of the rear module bearer frame 17. The matching supporting and joining means have flush boreholes or holes—see FIG. 19, 20 in particular—through which screws can be passed to securely join the two cab modules 5, 6 on a longitudinal, transverse and vertical axis, and enable them to be separated again.

In the example shown, the two front module supporting brackets 22, 23 extend behind the front module rear wall 10 on a plane parallel to the lengthwise vertical plane of the vehicle, and each exhibits a seating surface 34, 35 extending obliquely rearwards and upwards at the same acute angle to the horizontal.

The matching means of support 28, 29 on the rear module are each formed by a section at the bottom front of a spar 36, 37 of the rear module bearer frame 17, whereby the undersides of these sections 28, 29 are at the same oblique angle to the horizontal as the matching seating surfaces 34, 35 on the front module supporting brackets 22, 23. In this way the cab rear module 6 is supported on the cab front module 5 by sloping ramps when in position for attachment to it.

As means for secure crosswise and vertical attachment of the rear module 6 to the front module 5 at their top there are two retaining brackets 26, 27, each arranged at the top of one of the vertical spars 24, 25 reinforcing the front module rear wall 10. These retaining brackets 26, 27 match means of attachment 32, 33 on the bearer frame 17 of the rear module 6.

In the illustrated example of implementation, each of the two front module retaining brackets 26, 27 extends behind the front module rear wall 10 on a plane parallel to the lengthwise vertical plane of the vehicle, obliquely upwards and rearwards at an acute angle to the horizontal, and is formed by a, seen in plan view, U-shaped punched sheet metal part, each of these having two parallel spaced side members 26a, 26b and 27a, 27b joined by a cross bar 26c and 27c. Each of these U-shaped retaining brackets 26, 27 is attached, preferably welded, to the top—gripping the front and sides—of one of the two vertical spars 24, 25 reinforcing the rear wall 10 of the front module 5. The matching top means of attachment 32, 33 on the rear module are each formed by holding plates attached in the corners between a front vertical spar 38, 39 and a top longitudinal spar 40, 41 of the rear module bearer frame 17. When the rear module 6 is in position for attachment to the front module 5, these bearer frame corners with the holding plates (32, 33) fit between the two side members 26a, 26b or 27a, 27b of one of the retaining brackets 26, 27, and each exhibits at least one through-hole 32', 33', flush with the through-holes 26', 27' in the side members 26a, 26b and 27a, 27b of the front module retaining brackets 26, 27, to hold screws 75 for attachment of the two cab modules 5, 6. These screws 75 grip—as clearly shown in FIG. 19—in threaded boreholes of nuts or thread plates 76 on the outside of the retaining brackets 26, 27 opposite the screw heads. This produces secure vertical and crosswise attachment of the rear module 6 to the front module 5 at the top.

The join between the front module 5 and the rear module 6 in the illustrated example is as follows.

The front module supporting brackets 22, 23 are formed by punched sheet metal parts that are attached to the ends of the longitudinal floor members 18, 19 and, at least for a large part of the resting and joining area for the lower rear module supporting means 28, 29 and attachment means 30, 31, exhibit a U-shaped, open-topped cross-section, whereby the bottoms 34, 35 in these cross-section regions essentially assume the supporting and carrying function and the side walls 22a, 22b and 23a, 23b with their crosswise through-holes 78 the crosswise and vertical securing plus attachment function for the rear module 6 when it is in place. The matching bottom means of attachment 30, 31 on the rear module are each formed by holding rails attached in the region of the supporting means 28, 29 on top of the spars 36, 37 of the rear module bearer frame 17. When the rear module 6 is in position for attachment to the front module 5, the two front vertical spars 38, 39 and the two bottom spars 36, 37, with the holding rails 30, 31, of the rear module 17 behind them fit between the two side walls 22a, 22b or 23a, 23b of one of the supporting brackets 22 or 23, and the rear module 6 is seated with the supporting means 28, 29 of its bearer frame 17 on the bottoms 34, 35 of the supporting brackets 22, 23. Screws 79 are passed through the flush screw holes 78 and boreholes 77 and grip in threaded boreholes of nuts or thread plates 80 on the outside of the retaining brackets 22, 23 opposite the screw heads. This produces secure vertical and crosswise attachment of the rear module 6 to the front module 5 at the bottom.

Figure 19:
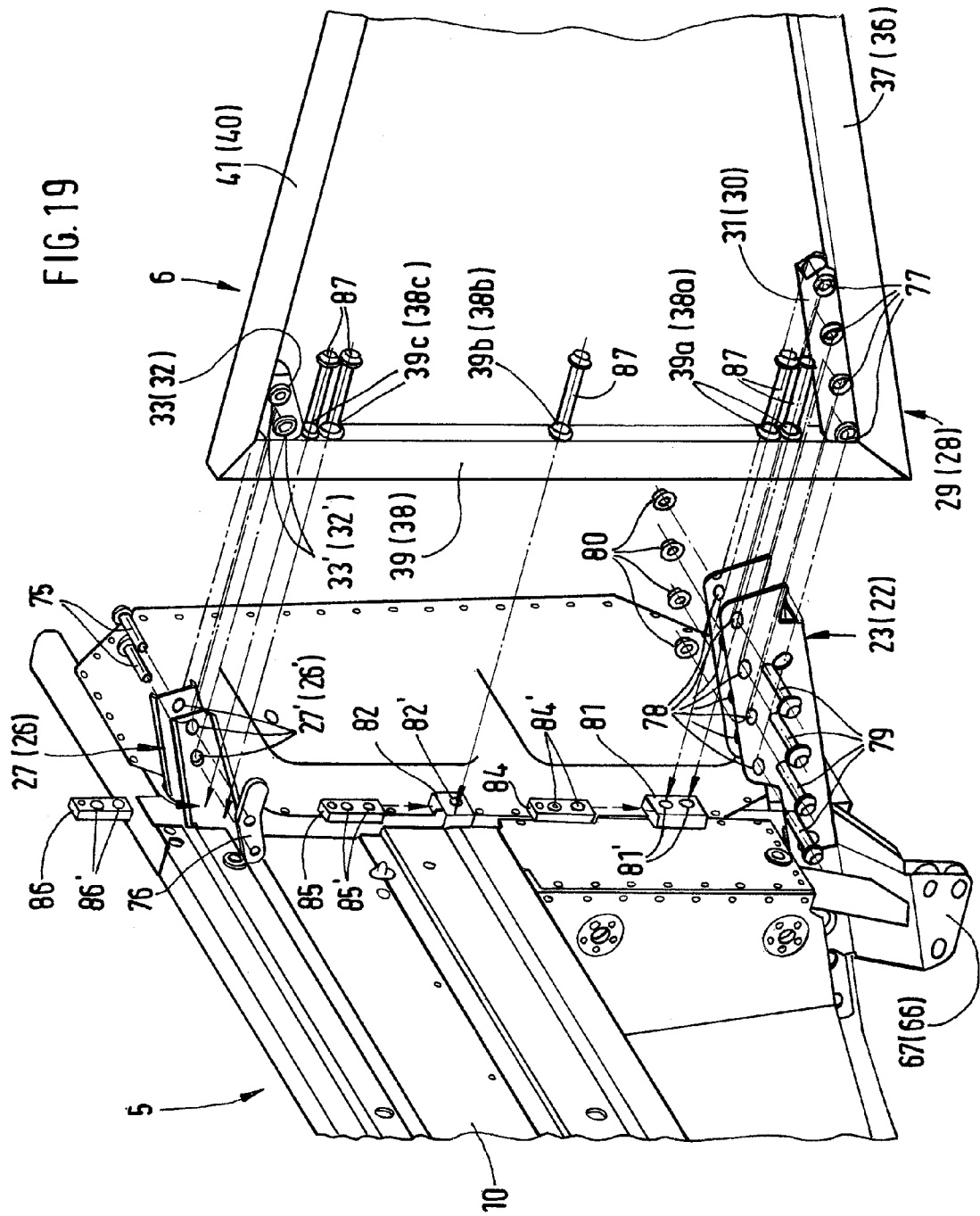
FIG. 19 is a detailed view of the join between the cab front module and rear module.

For secure lengthwise support and attachment of the rear module 6 to the front module 5 the example uses the following means, which are well illustrated in FIG. 19.

For this purpose there are multiple—in this case three—stops and clips 81, 82, 83 attached, preferably welded, at different levels on each of the two vertical spars 24, 25 reinforcing the front module rear wall 10. The stops and clips 81, 82, 83 are formed by punched sheet metal parts, have a U-shaped cross-section, and are welded onto the vertical spars 24, 25 by their side clips so that their outer plates are spaced a certain distance from the reverse side of the particular vertical spar 24, 25. In this way, in the region of the particular stop and clip 81, 82, 83 a pocket is formed into each of which a thread plate 8485 can be inserted with slight clearance, and is thus floating. The outer plate of each stop and clip 81, 82, 83 exhibits at least one through-hole 81', 82', 83' and an outer resting surface projecting from the rear of the front module rear wall 10 by a certain amount, and extending on a plane parallel to it. The faces of the two front vertical spars 38, 39 of the rear module 6, when it is attached to the front module 5, stop against the three resting surfaces at different levels on the vertical spars 24, 25. In the vertical spars 38, 39 of the rear module bearer frame 17 there are through-holes 38a, 38b, 38c and 39a, 39b, 39c that, when the rear module 6 is in place for attachment to the front module 5, are flush with the through-holes 81', 82', 83' in the outer plates of the stops and clips 81, 82, 83 and through which retaining screws 87 can be threaded that grip in the threaded boreholes 84'85' of the thread plates 84', 85', 86'. Tightening the screws 87 causes the thread plates 84-86 in each stop and clip 81, 82, 83 to be pressed against the inner faces of their outer plates, and the faces of the vertical spars 38, 39 against the outsides of the stop plates. These friction locked connections produce a secure lengthwise join between the rear module 6 and the front module 5.

As this example of implementation shows (see FIGS. 1, 3, 5, 6), one of the two side walls 8, 9 of the cab front module 5—in this case 8—is longer than the opposite one. Furthermore, the rear of these two side walls 8, 9 differing in length is formed by an angled rear wall 10, creating, in addition to a for the most part straight rear wall section 10a, a cab alcove 46 projecting beyond this to the rear that is demarcated on the inside by a rear wall section 10b, at the back by a rear wall section 10c, and on top by an appropriate extension 12a of the roof 12. Matching this implementation the cab rear module 6 exhibits on the same side at the front a cutout 47 large enough to accommodate the cab alcove 46 projecting from the back of the front module 5 when the rear module 6 is attached to the front module 5. In this case the join between the front module 5 and the rear module 6 is made using the means intended for this purpose and already detailed, i.e. only behind the straight rear wall section 10a and not in the cab alcove 46 or the matching cutout 47.

In the illustrated implementation the cab rear module 6 also exhibits, on the side opposite the cutout 47, a space 48 to hold a spare wheel (not shown) and an accompanying lifting/lowering device (likewise not shown). This stowage space 48 is bordered on the inside by the side wall 14, offset inwards from the side wall 9 of the front module 5, a floor 49 and a rear bulkhead 50, but open towards the outside. The floor 49 is supported by a reinforcing carrier arrangement 51 that forms part of the rear module bearer frame 17.

A retaining plate 52 with sideways projecting bolts 53 is attached to the side wall 14 of the bearer frame 17 for stowage of the spare wheel.

In the illustrated example of implementation the bearer frame 17 of the rear module 6 consists of the following parts:
  the two parallel front vertical spars 38, 39, spaced to fit into the front module supporting brackets 22, 23, and joined at the top by a cross spar 54 to form a portal open to the front;
  two parallel rear vertical spars 55, 56, spaced like the front vertical spars 38, 39, joined by an upper cross spar 57 and a middle cross spar 58, forming with the vertical spars 55, 56 the reinforcement of the rear module rear wall 15, and also joined to the front vertical spars 38, 39, the bottom oblique longitudinal spars 36, 37 and top longitudinal spars 40, 41 reinforcing or carrying the roof 16, whereby the particular spar array is reinforced by a grid arrangement of struts 59;
  in addition to the previously described, portal-like part of the bearer frame, a framework strutted with this by cross spars 60, reinforcing the side wall 13, and composed of multiple single spars 61, 62, 63, 64, 65.

Each of the bottom longitudinal spars 36, 37 joins the bottom end of the front vertical spar 38, 39 to point backwards and upwards, and thus draw an acute angle to the horizontal with their undersides forming the supporting means 28, 29, said angle corresponding to that drawn to the horizontal by the seating surfaces 34, 35 on the front module supporting brackets 22, 23.

What follows are further details of the inventive manner of armouring the cab.

The rear armouring of the cab would normally be attached to the back end of the rear module. The invention takes a different approach because here the rear armouring of the cab 1 is implemented by armour plates 88 inserted between its front module 5 and rear module 6 (see FIGS. 18 and 20). Multiple adjacent armour plates 88 are attached in front of the rear module 6 on the front module rear wall 10, covering it entirely or at least for the most part. In the illustrated example there are four armour plates 88, one of which covers the rear wall section 10c at the back of the alcove 46, another the rear wall section 10b on the side of the alcove 46, a third about ⅔ left—seen from the rear as in FIG. 4—of the rear wall section 10a, and a fourth the remaining ⅓ on the right of the rear wall section 10a. The armour plates 88 are preferably attached to the front module rear wall 10 so they can be detached. The armour plates 88 each exhibit multiple through-holes, in the corners or on the edges, through which retaining screws are threaded that are screwed into threads inside the front module rear wall 10, and when tightened press the armour plates 88 against stops on the front module rear wall 10.

Figure 4:
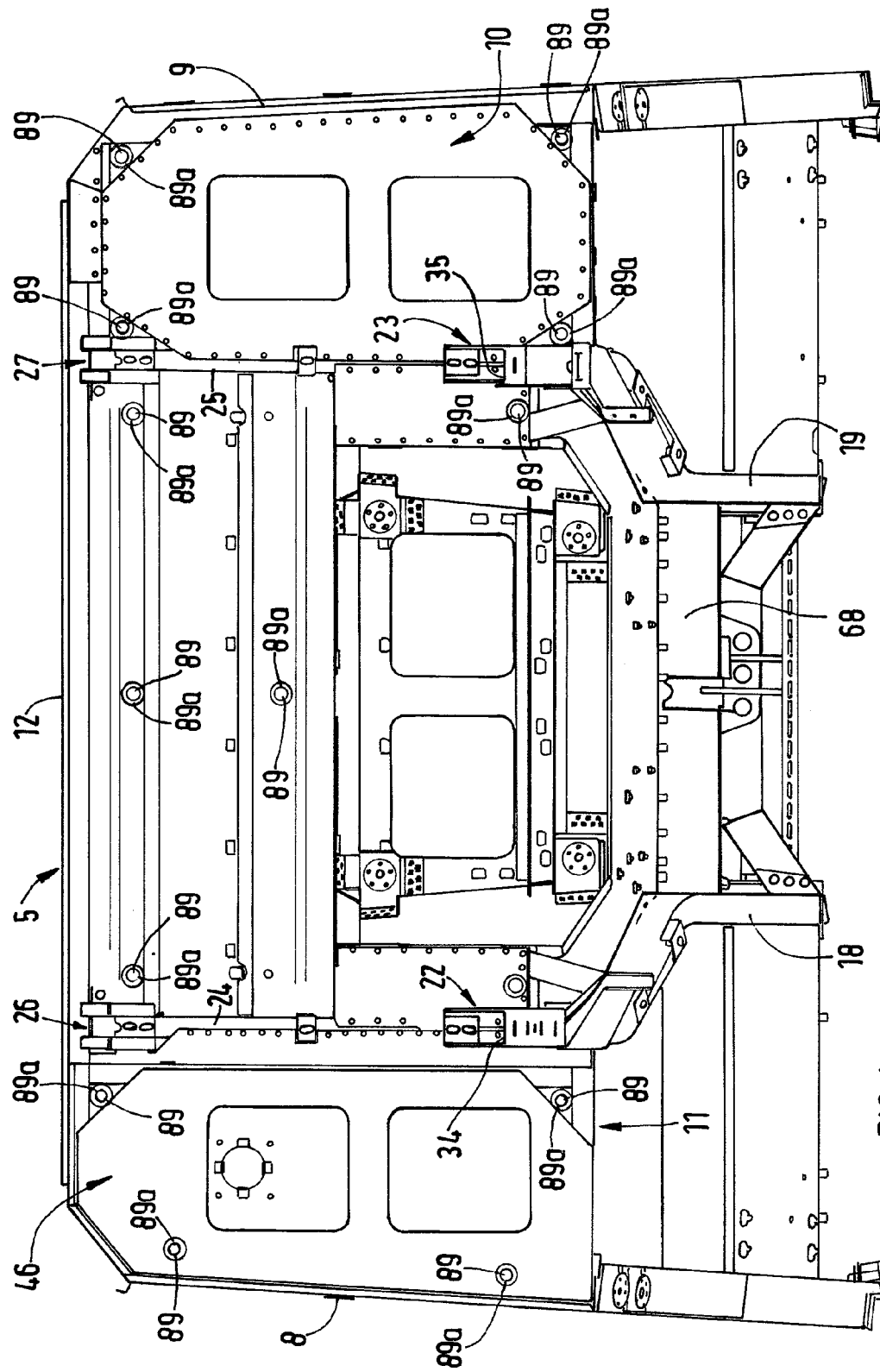
FIG. 4 depicts the cab front module of FIG. 1 from the rear.
Figure 5:
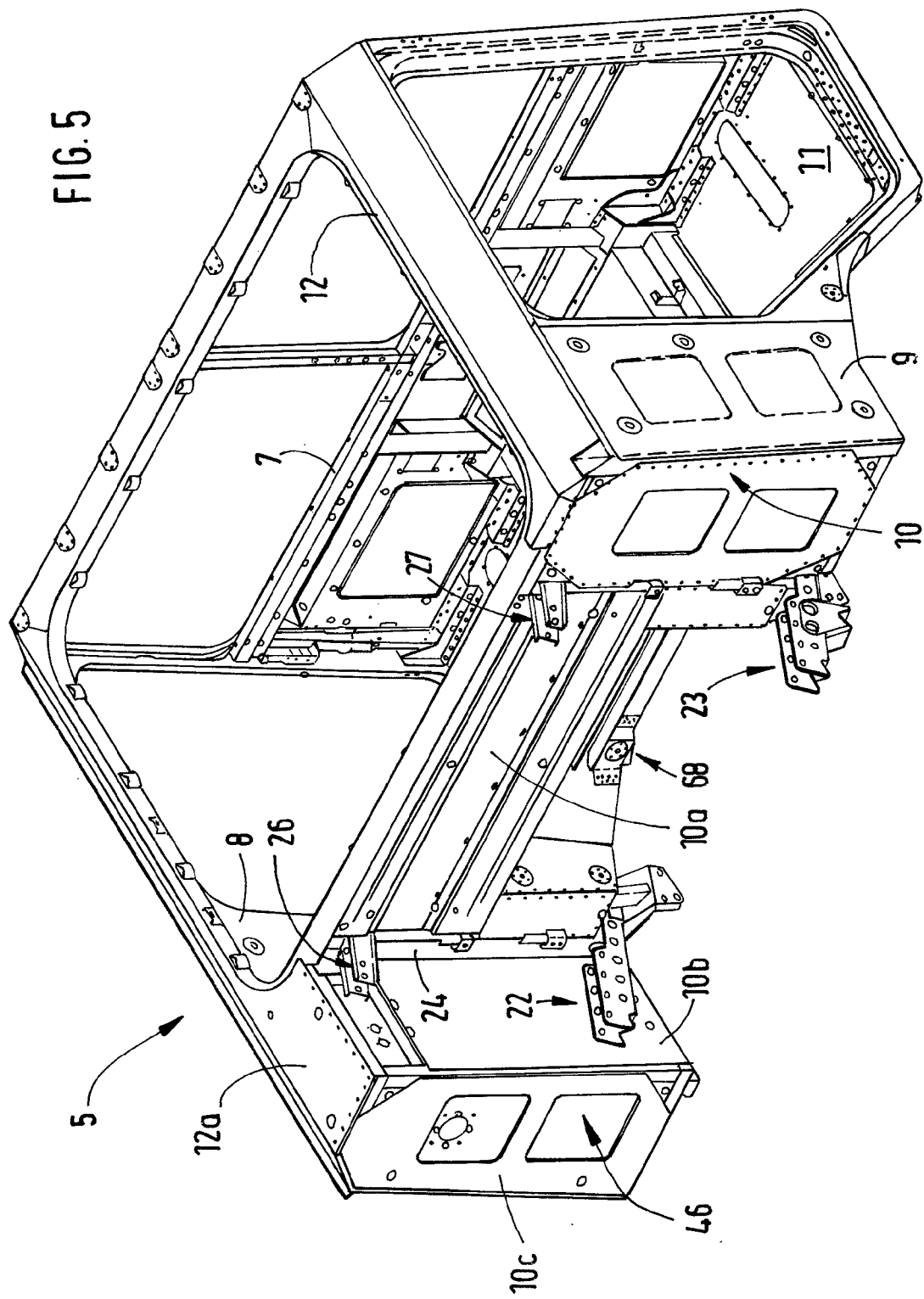
FIG. 5 depicts the cab front module of FIG. 1 in perspective from top rear right.
Figure 6:
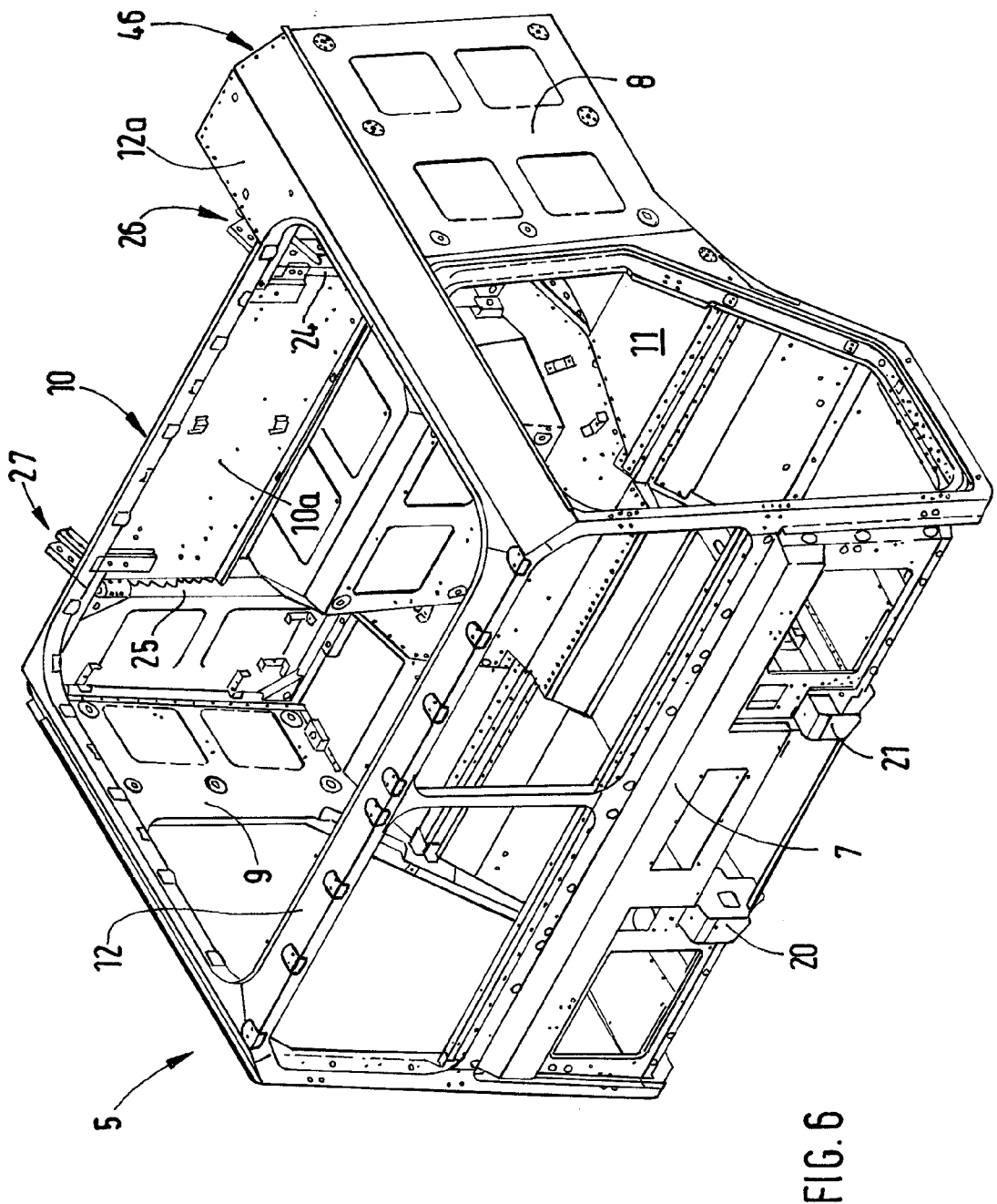
FIG. 6 depicts the cab front module of FIG. 1 in perspective from top front left.
Figure 7:
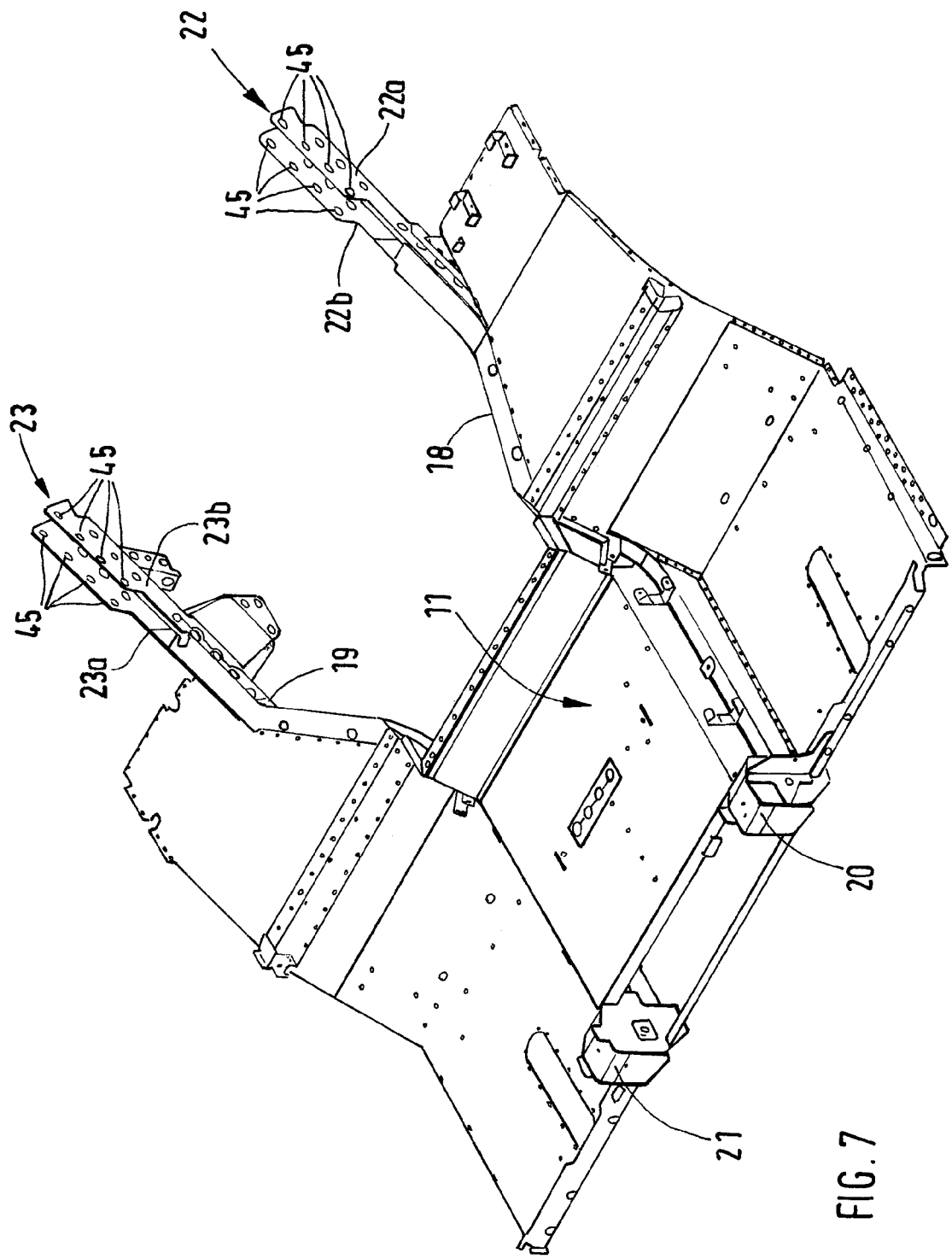
FIG. 7 depicts the floor assembly of the cab front module of FIG. 1 in perspective from top front left.
Figure 8:
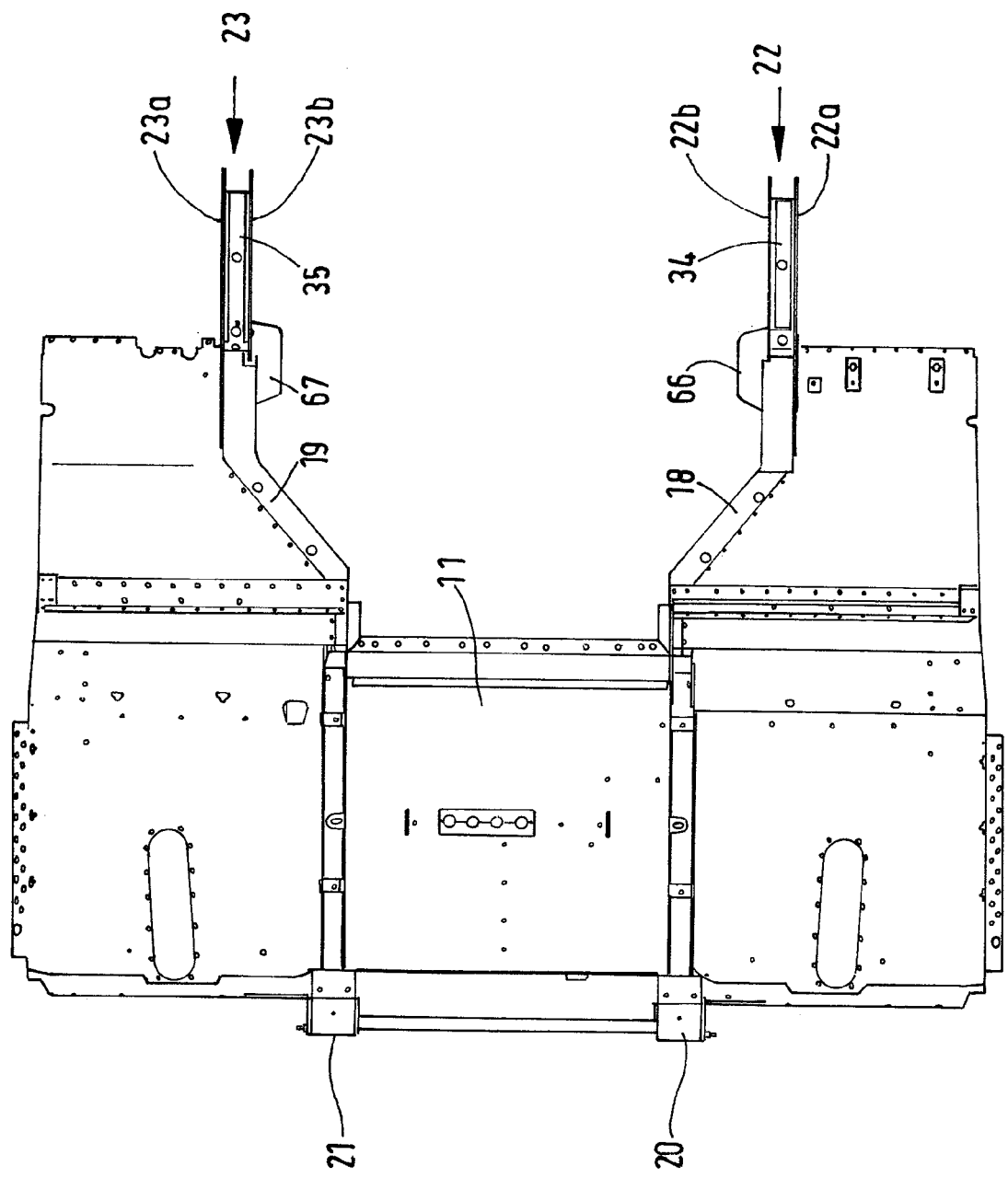
FIG. 8 depicts the floor assembly of the cab front module of FIG. 1 in plan view.
Figure 9:
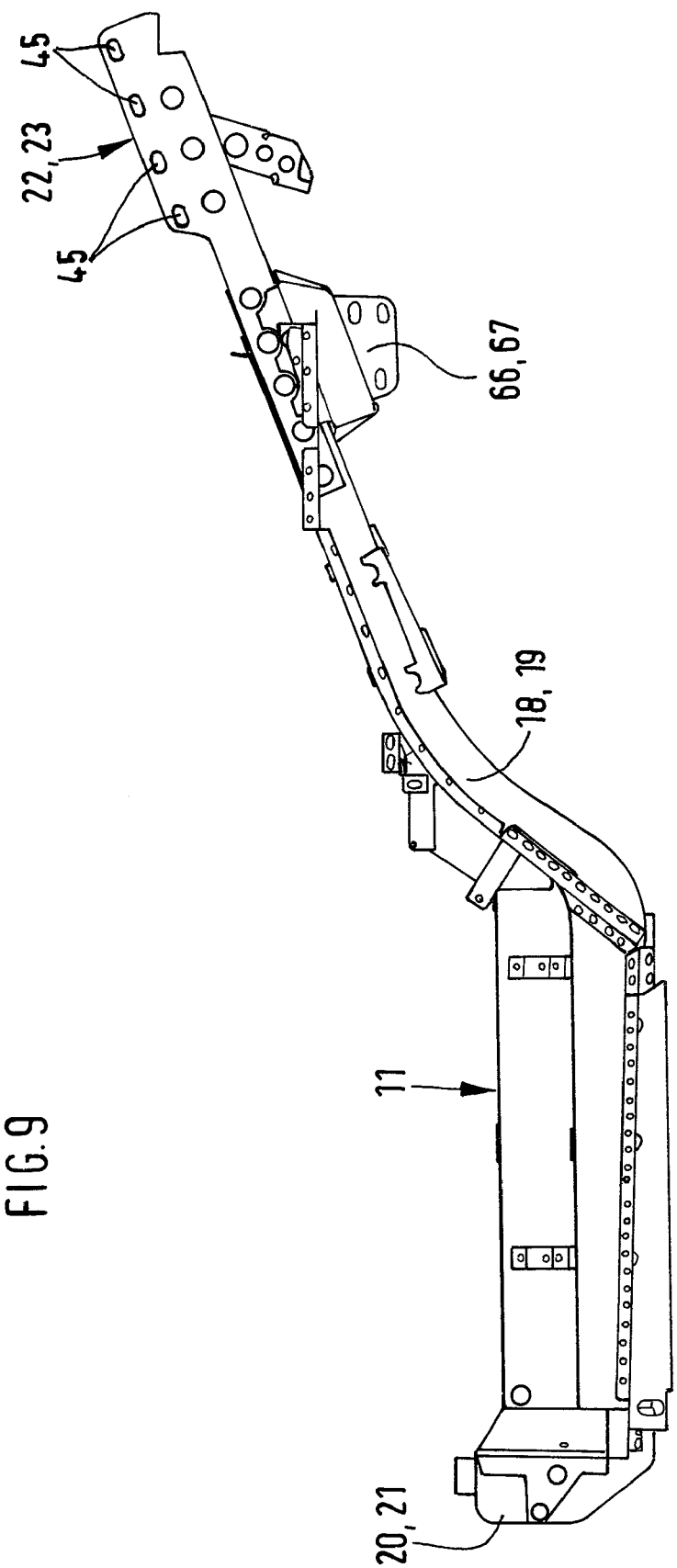
FIG. 9 depicts the floor assembly of the cab front module of FIG. 1 from the left.
Figure 10:
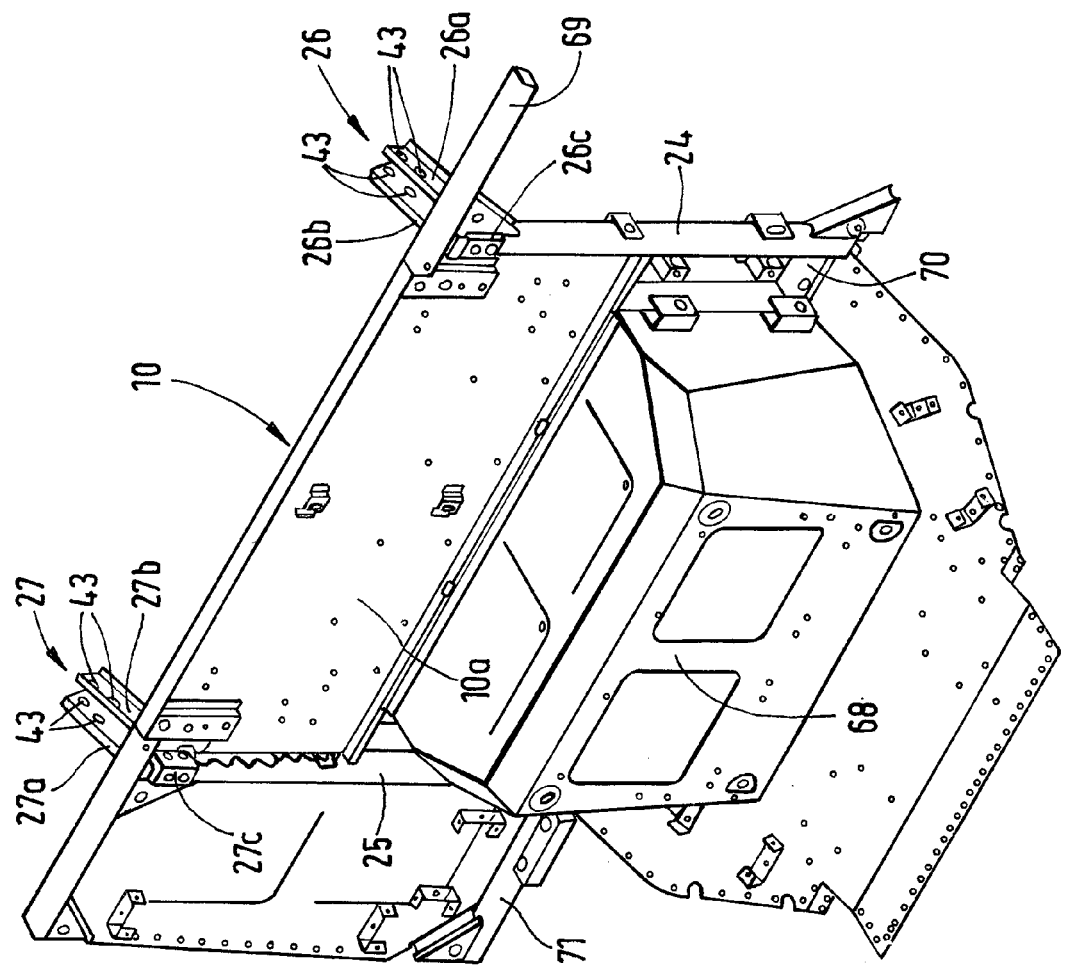
FIG. 10 depicts the rear wall assembly of the cab front module of FIG. 1 in perspective from top front left.
Figure 11:
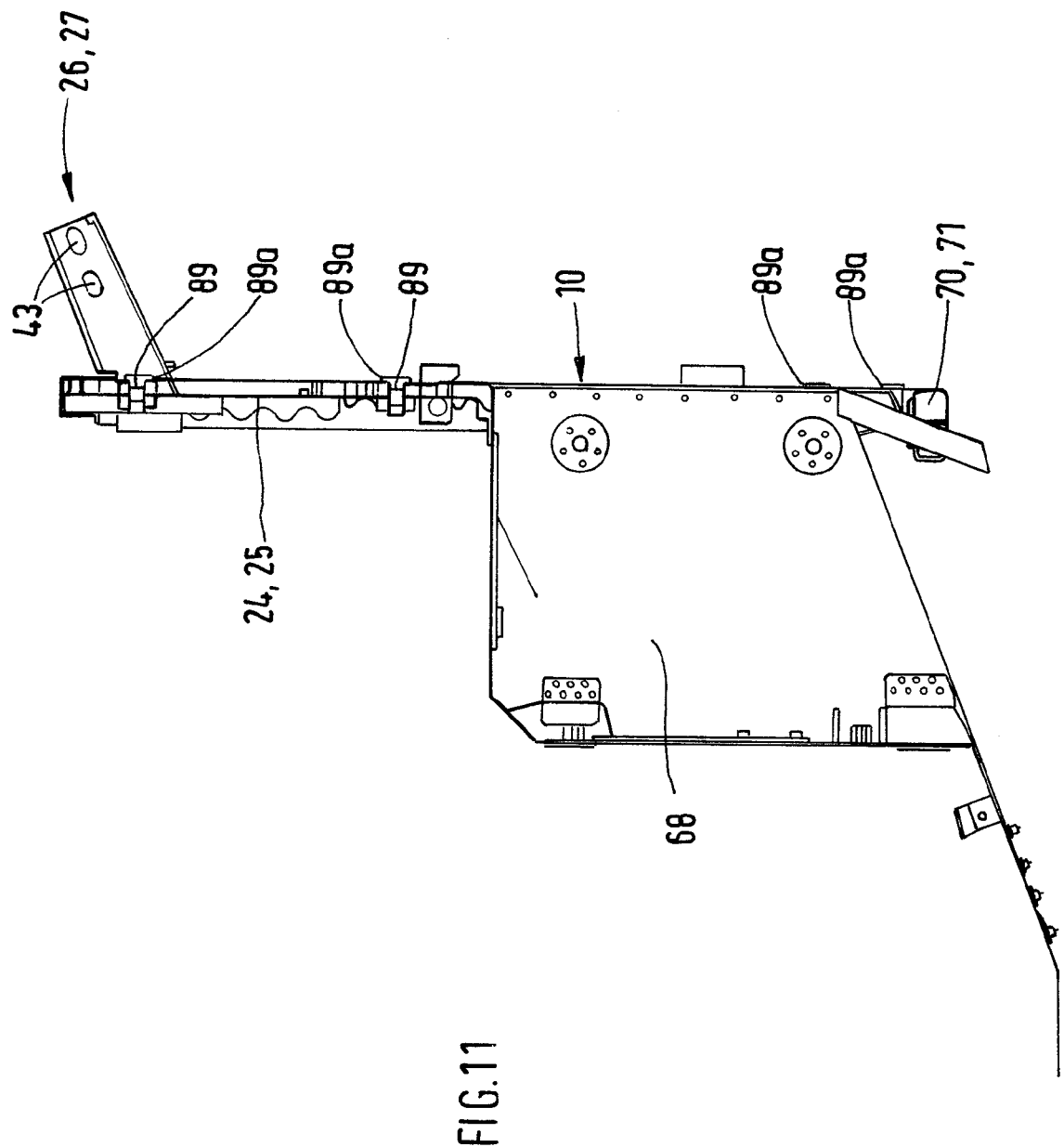
FIG. 11 depicts the rear wall assembly of the cab front module of FIG. 1 from the left.
Figure 12:
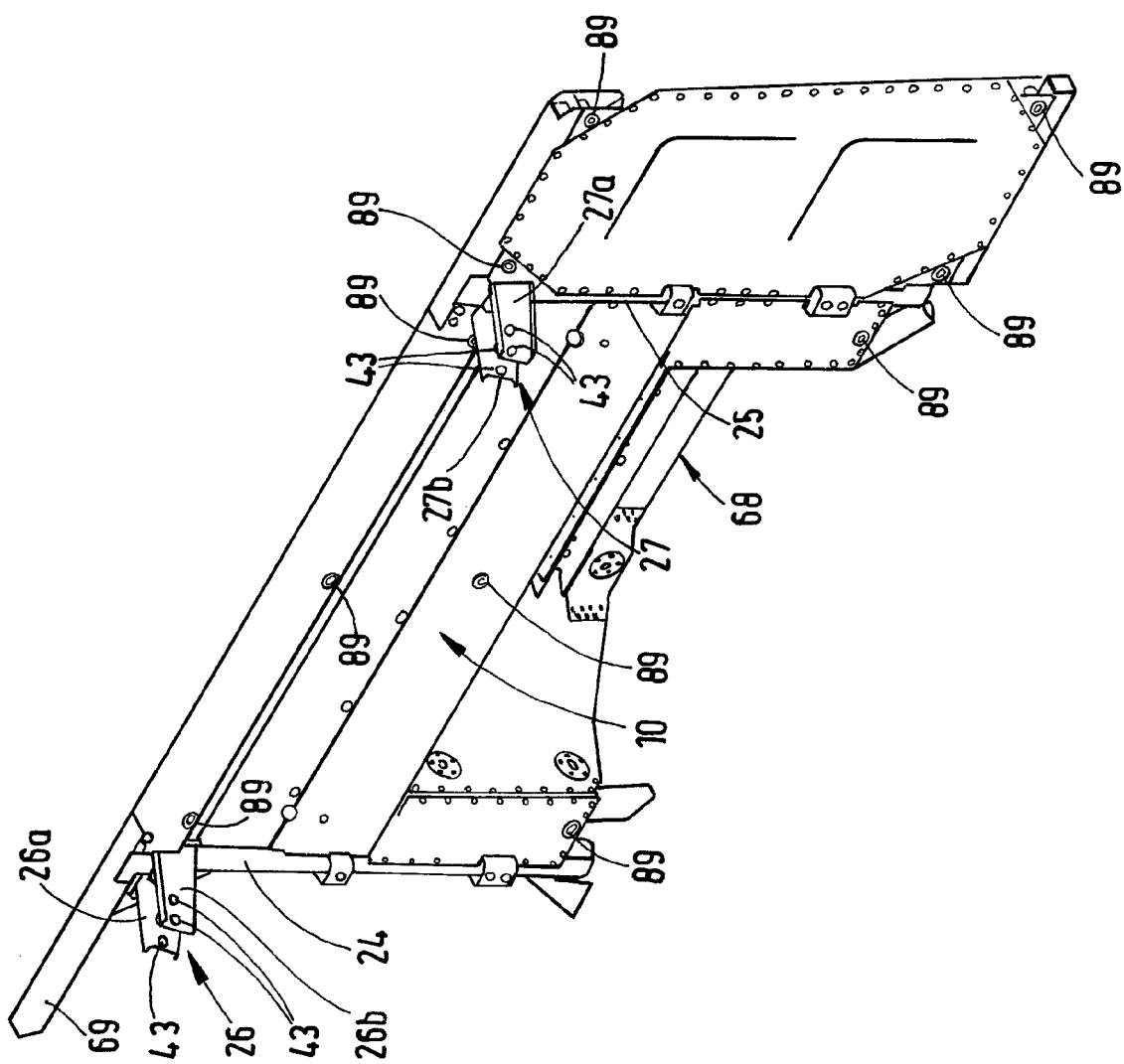
FIG. 12 depicts the rear wall assembly of the cab front module of FIG. 1 in perspective from rear right.
Figure 13:
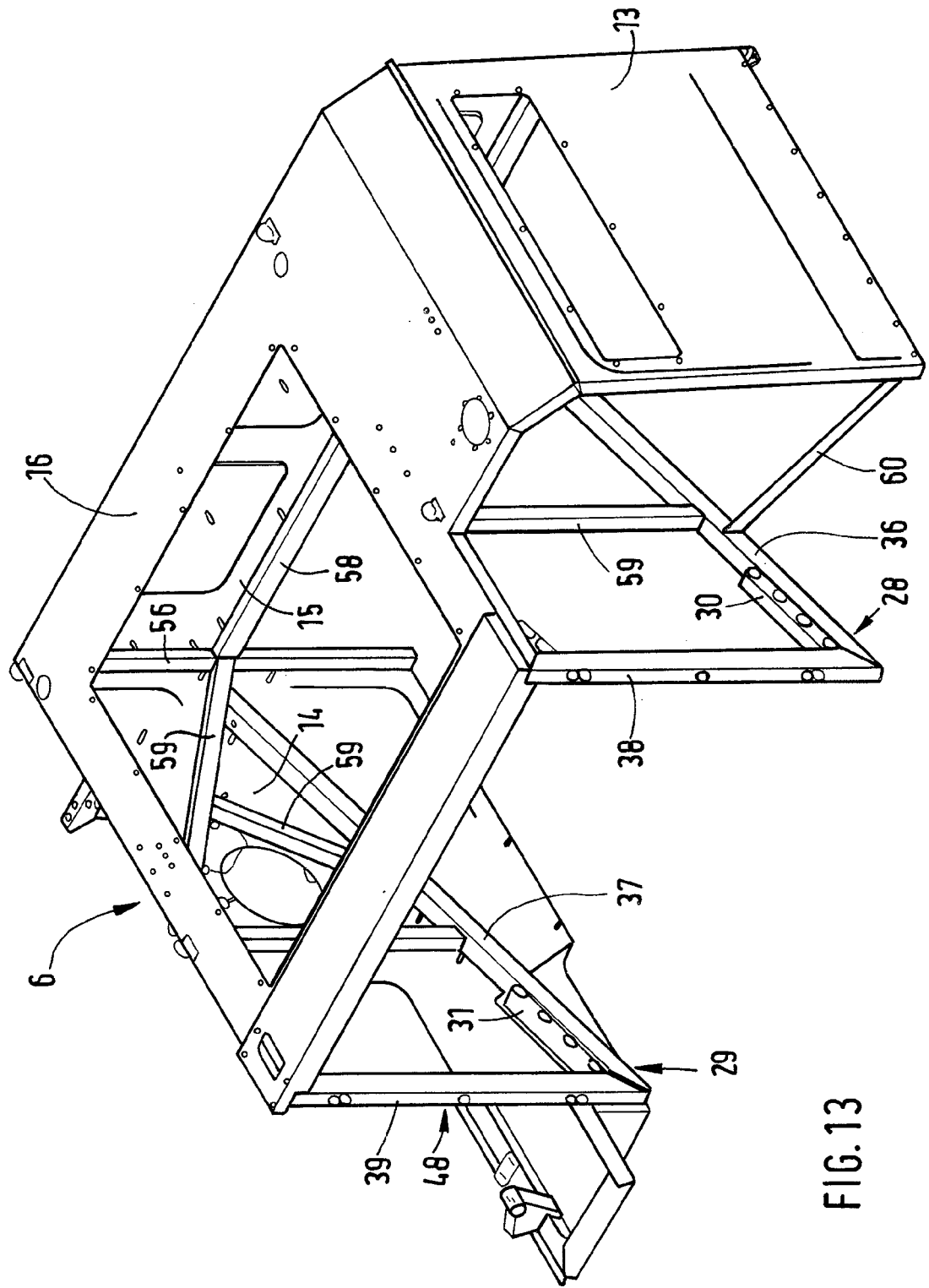
FIG. 13 depicts the cab rear module of FIG. 1 in perspective from top front left.
Figure 14:
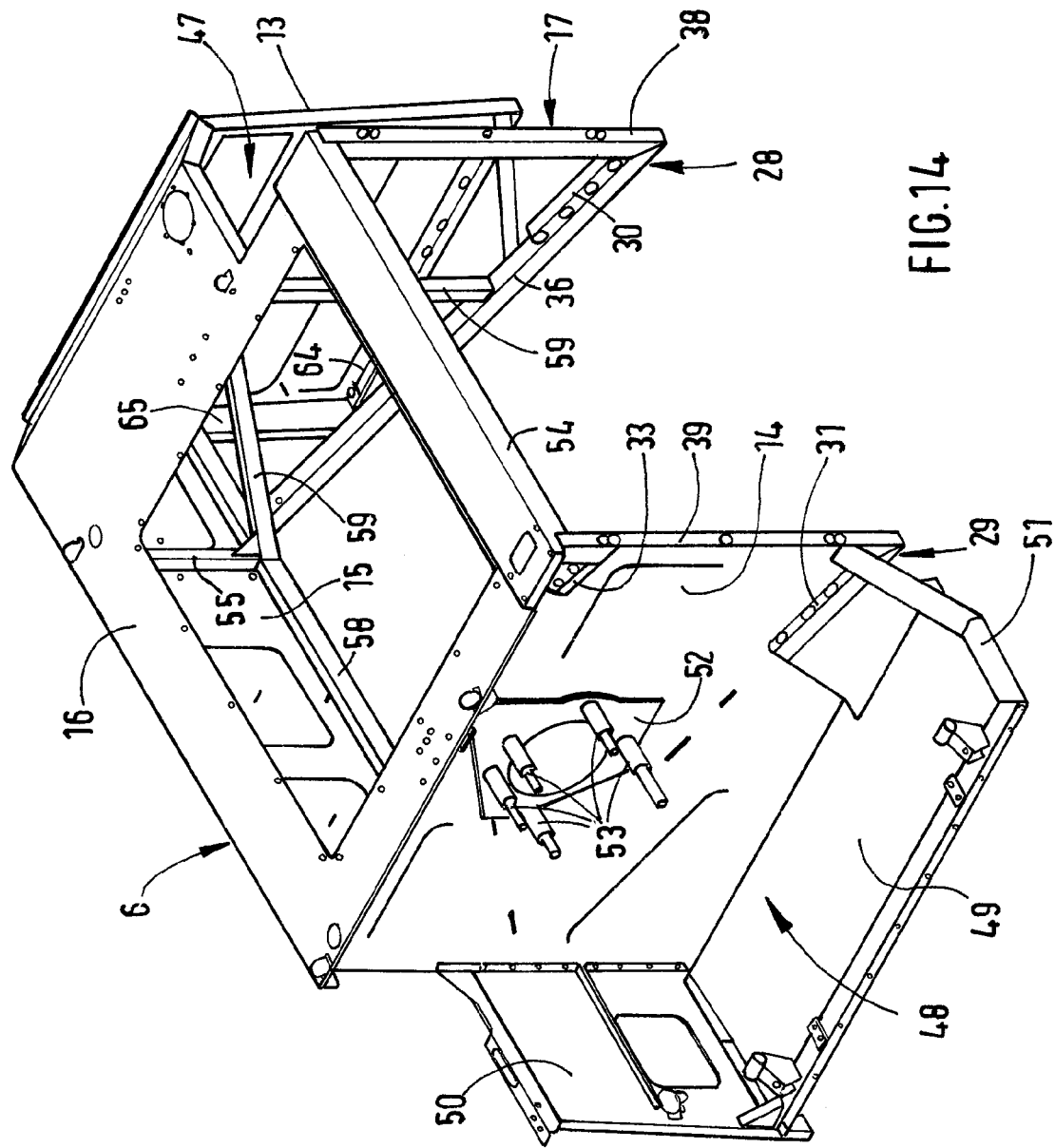
FIG. 14 depicts the cab rear module of FIG. 1 in perspective from top front right.
Figure 15:
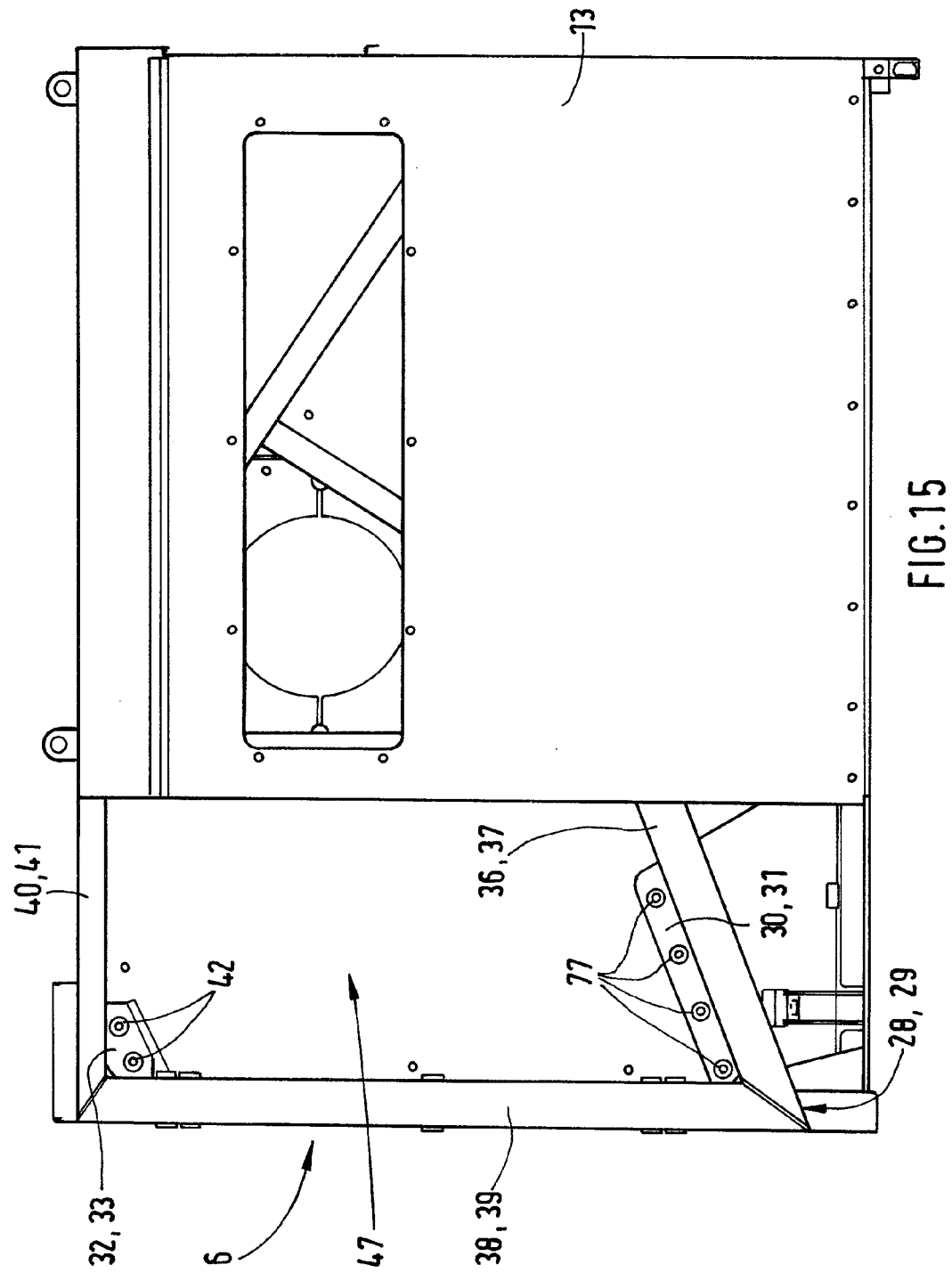
FIG. 15 depicts the cab rear module of FIG. 1 from the left.
Figure 16:
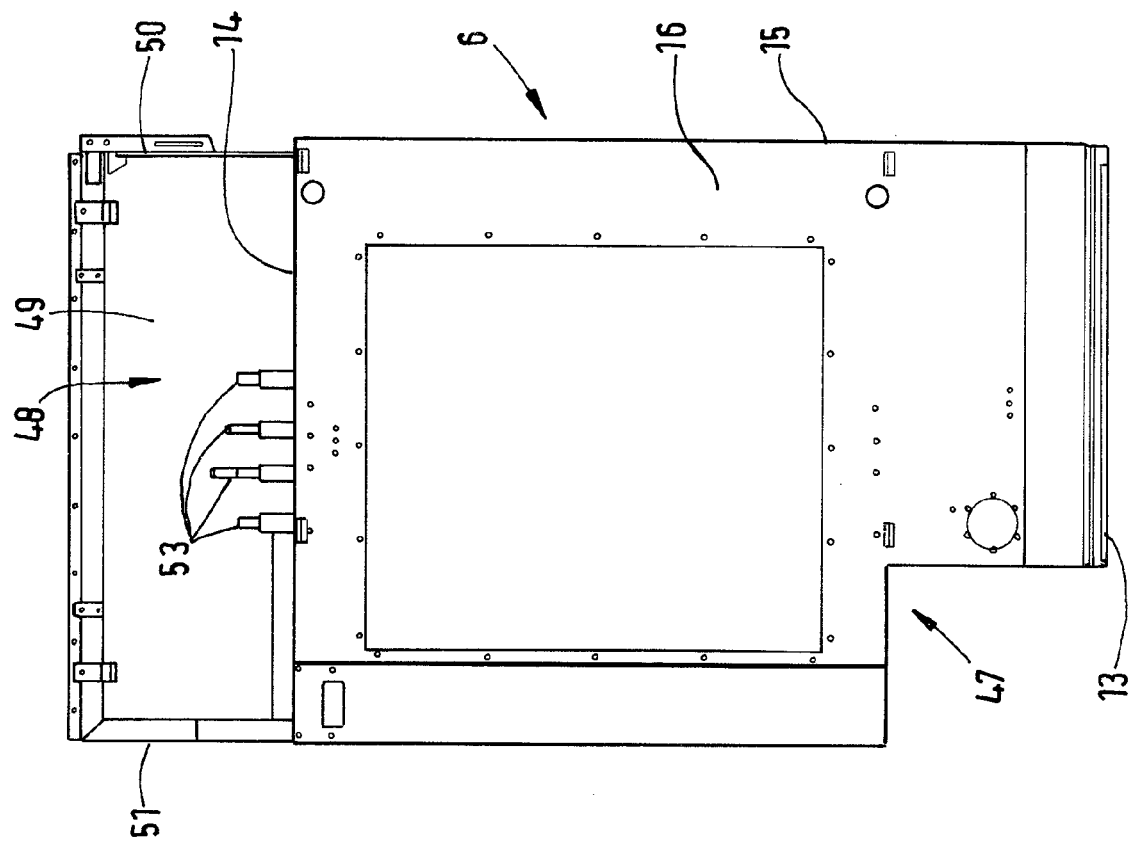
FIG. 16 depicts the cab rear module of FIG. 1 in plan view.
Figure 17:
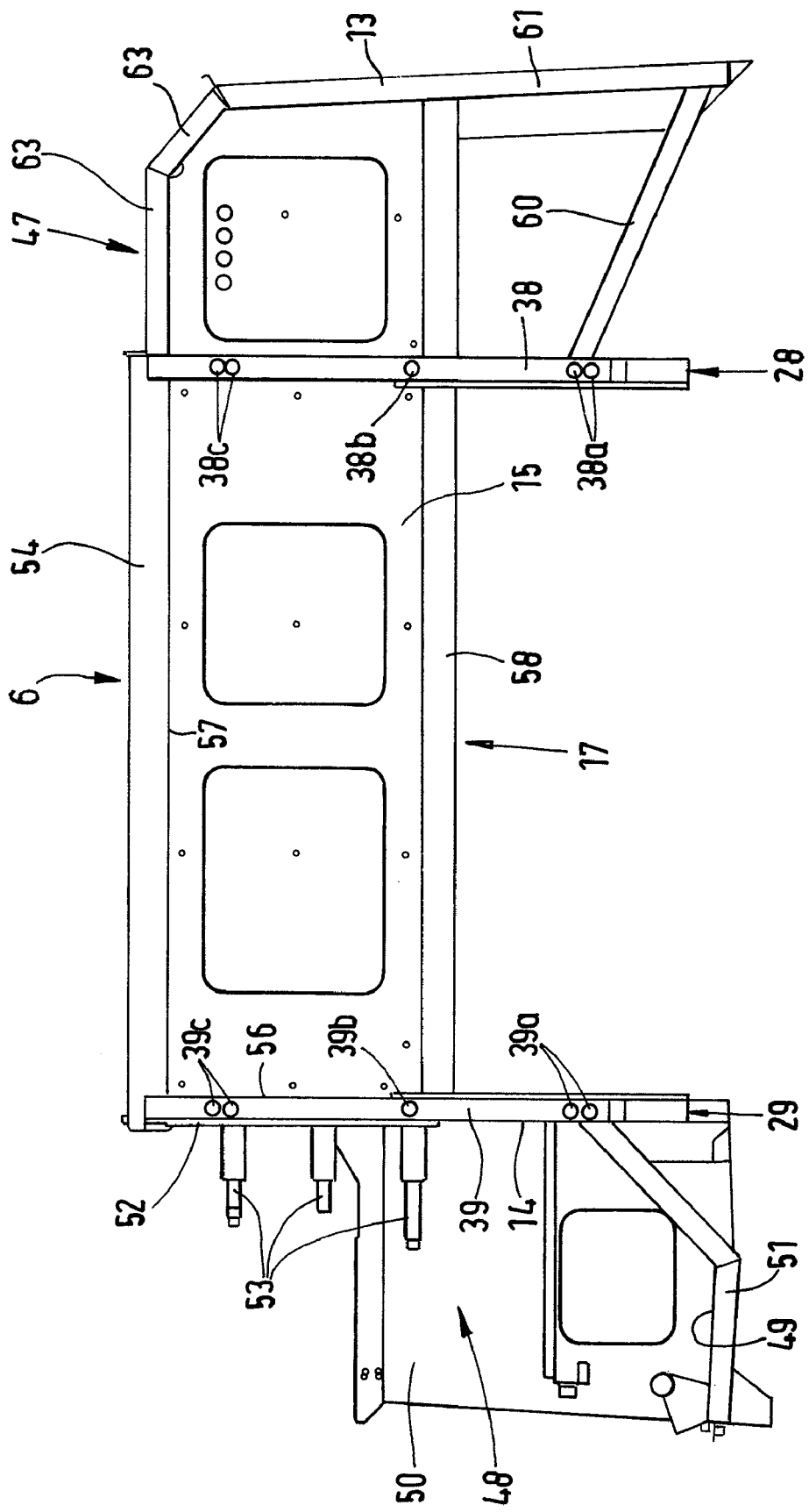
FIG. 17 depicts the cab rear module of FIG. 1 from the front.
Figure 20:
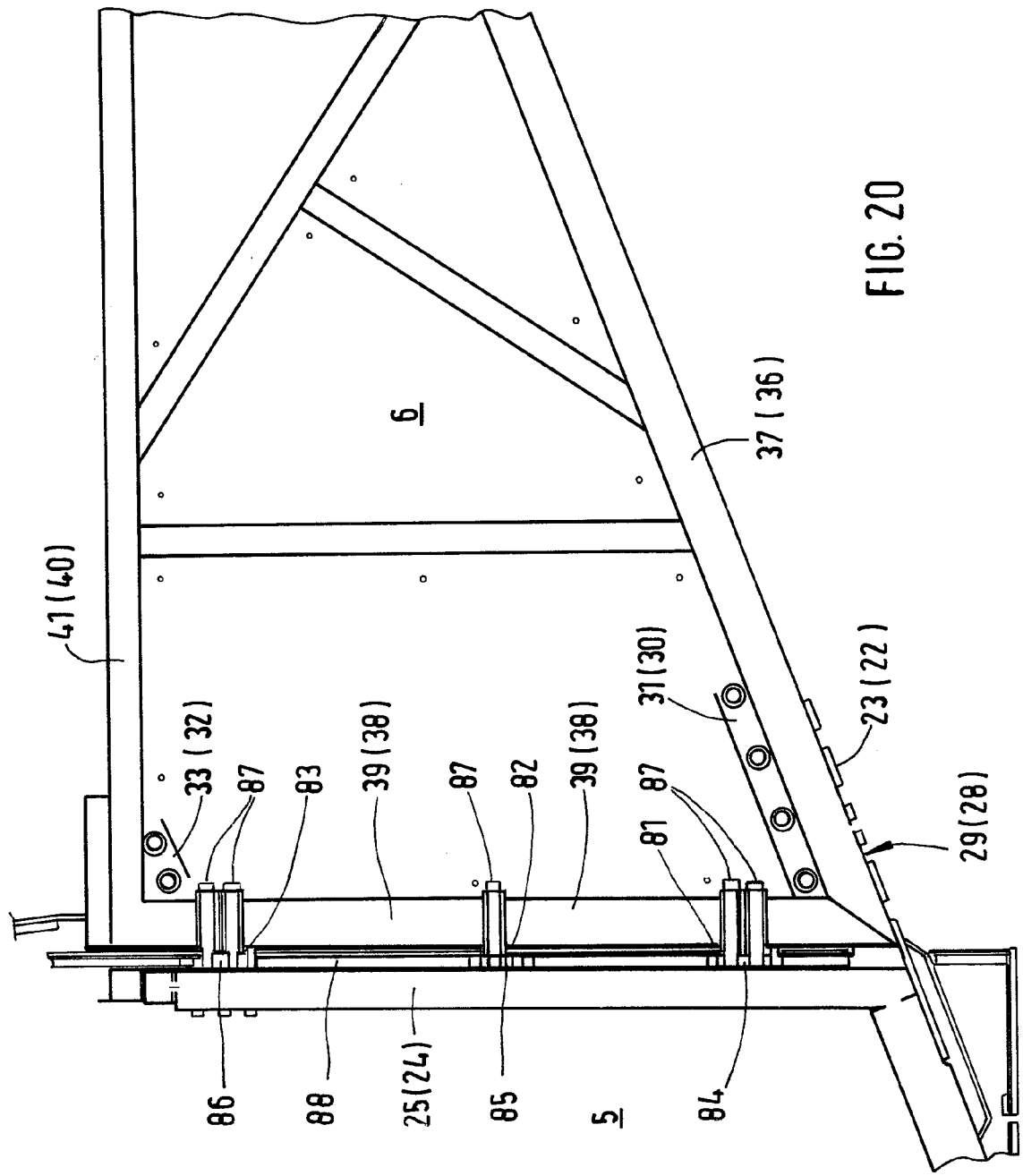
FIG. 20 is a schematic section of the join between the cab front module and rear module with armouring.

In the illustrated example the threads inside the front module rear wall 10 for attachment of the armour plates 88 are contained in threaded shells 89 that are welded into the structure of the front module rear wall 10, and exhibit a flange 89a that forms a stop to support an armour plate 88 (see FIGS. 4, 11 and 20).

The armour plates 88, depending on the desired degree of protection against fire, are formed of steel or sandwich plates of appropriate thickness, with multiple different material layers on top of one another and firmly joined to one another, of steel or other metals or alloys, fiber or fleece reinforced plastics, ceramic or ceramic compounds and the like.

The spacing of the outer plates of the stops and clips 81, 82, 83, on which the rear module 6 is supported when in place on the front module 5, is also matched to the maximum intended thickness of the armour plates 88. In other words the armour plates 88 are supported on the flanges 89a of the threaded shells 89 on the front module rear wall 10 so that a minimum spacing is left between the outer faces of the armour plates 88 and the adjoining rear module 6 when it is in place on the front module 5. This is well illustrated in FIG. 20.

Now a few general remarks about production of the cab.

The floor 11 of the cab front module 5 together with the longitudinal floor members 18, 19, the supporting brackets 22, 23 attached to their ends and further built-on parts such as brackets 66, 67 for the rear cab suspension are fully prefabricated and preassembled as a separate floor assembly.

The rear wall 10 of the cab front module 5 together with the spars 24, 25 and other spars 69, 70, 71 reinforcing it, the retaining brackets 26, 27 attached to the spars 24, 25, stops and clips 8182 and further built-on parts such as an engine compartment hood 68 are fully prefabricated and preassembled as a separate rear wall assembly.

The prefabricated floor unit and rear wall unit are joined together and to the other walls 7, 8, 9 and roof 12 of the cab front module 5 while a body in white.

The cab rear module 6 and the cab front module 5 are also each separately prefabricated and preassembled. The armour plates are ready attached to the cab front module 5. In final assembly of the cab these two preassembled modules 5, 6 are joined at the ready prepared points and screwed together.

The cab 1 composed of the two modules 5, 6 is attached to the chassis frame 4 of the utility vehicle in a way that allows it to be tilted, as indicated in FIG. 18. The front suspension of the cab 1 is by front bearings 2, 3 in the region of the front floor bearing cases 20, 21 in conjunction with bearing brackets in the front of the chassis frame 4. The rear cab suspension in the illustrated implementation, as shown in FIG. 18, is about halfway along the ready assembled cab 1, but still in the region of the floor 11 of the cab front module 5, over locking elements 69, 70 attached to floor brackets 66, 67 that interact with locks 44, 45 arranged on frame brackets 42, 43.

With the rear part of the front module 5 and the front part of the rear module 6, the inventive cab covers a power aggregate installed between the two longitudinal members of the chassis frame 4, and that usually consists of an internal combustion engine, a clutch and a gear shift or automatic transmission. The rear module 6 of the cab 1 serves on the one hand as a protective hood for aggregates and parts attached beneath it to the chassis frame 4, such as the power aggregate, radiator, fan, and on the other hand as stowage space for other vehicle aggregates and parts, accessories and the spare wheel, etc. The rear module also forms a first safety zone against fire from behind.

The invention claimed is:

1. A utility vehicle comprising:
   a frame;
   a cab tiltingly arranged on the frame, the cab comprising a front module and a rear module;
   the front module forming a cabin for a driver and co-driver of the utility vehicle and comprising:
      a front wall;
      two side walls configured to mate with the front wall;
      a rear wall configured to mate with at least one side wall;
      a floor configured to mate with at least one of the front, side, and rear walls; and
      a roof configured to mate with at least one of the front, side, and rear walls;
   the rear module comprising:
      a bearer frame; and
      a plurality of walls configured to partially enclose the bearer frame configured to form a hoodlike protective and stowage space; and
   armor plating fitted between the front module and the rear module,
   wherein the rear module is releaseably attached to the front module so that it can be released and supported by the front module.

2. The utility vehicle according to claim 1, further comprising multiple adjacent armor plates attached in front of the rear module on the front module rear wall covering at least a part of the front module rear wall.

3. The utility vehicle according to claim 2, wherein the armor plates are detachably attached to the front module rear wall.

4. The utility vehicle according to claim 3, wherein each of the armor plates comprises a plurality of through-holes, the through holes arranged in at least one of corners or edges of the armor plates, wherein retaining screws extend through the through holes and are screwed into threads inside the front module rear wall, and when tightened, press the armor plates against stops on the front module rear wall.

5. The utility vehicle according to claim 4, wherein the threads inside the front module rear wall for attachment of the armor plates are in threaded shells that are welded into the structure of the front module rear wall, and exhibit a flange that forms the stop to support the armor plates.

6. The utility vehicle according to claim 1, wherein the armor plates are formed of one of steel and sandwich plates having a plurality of material layers the material layers comprising at least one of steel, fiber, fleece reinforced plastics, ceramic, and ceramic compounds.

7. The utility vehicle according to claim 1, wherein there is a small gap between the armor plates attached to the front module rear wall and the rear module when the rear module is attached to the front module.

8. The utility vehicle according to claim 1, wherein the front module further comprises:
   two longitudinal floor members configured to reinforce the floor; and
   a supporting bracket coupled to each of the longitudinal floor members configured to projecting rearwards through the rear wall of the front module the rear to support the rear module; and
   supporting elements provided at a bottom of the bearer frame of the rear module by which the rear module rests on the supporting brackets when attached to the front module,
   wherein the front module rear wall and a front of the rear module bearer frame comprise matching supporting and joining elements having aligned boreholes at different levels through which screws are threaded to securely hold the two cab modules together on lengthwise, crosswise, and vertical axes.

9. The utility vehicle according to claim 8, wherein the two front module supporting brackets extend beyond the rear wall of the front module on a plane parallel to a lengthwise vertical plane of the vehicle, each supporting bracket comprises a seating surface extending obliquely rearwards and upwards at a same acute angle to the horizontal, and an associated rear module support each formed by a section arranged at a front on a lower spar of the rear module bearer frame, the rear module support having bottom edges arranged at the same oblique angle to the horizontal as the associated seating surfaces on the front module supporting brackets, whereby the rear module is held to the front module on sloping ramps.

10. The utility vehicle according to claim 8, further comprising:
    two retaining brackets provided at respective tops of vertical spars configured to reinforce the front module rear wall; and
    attachment brackets configured to match the retaining brackets provided on the bearer frame of the rear module,
    wherein the retaining brackets and the attachment brackets are joined by screws.

11. The utility vehicle according to claim 10, wherein each of the front module retaining brackets extends behind the rear wall of the front module on a plane parallel to a lengthwise vertical plane of the vehicle, obliquely rearwards and upwards at an acute angle to the horizontal, and the attachment brackets, of the rear module are each formed by a holding plate attached in a corner between a vertical spar and an upper longitudinal spar of the rear module bearer frame, said retaining plate having at least one crosswise borehole configured to mate with crosswise holes in the front module retaining brackets for secure vertical and crosswise attachment of the two cab modules.

12. The utility vehicle according to claim 9, wherein the front module supporting brackets are formed from punched sheet metal parts and exhibit a U-shaped, open-topped cross-section, whereby the bottoms in these cross-section regions essentially assume the supporting and carrying functionality and side walls assume the the crosswise and vertical securing plus attachment functionality for the rear module.

13. The utility vehicle according to claim 12, wherein lower rear module attachment brackets are formed by holding rails that are attached to spars with respective oblique faces of the rear module bearer frame, the lower rear module attachment brackets having multiple crosswise boreholes with which, when the rear module is in position for attachment on the front module, crosswise holes in the side walls of the front module supporting brackets are flush to hold screws for vertical and crosswise attachment of the two cab modules.

14. The utility vehicle according to claim 10, wherein the two front module retaining brackets are each formed by a U-shaped sheet metal part, consisting of two parallel spaced side members joined by a cross bar, each retaining bracket attached to a top of one of two vertical spars configured to reinforce the front module rear wall, whereby, when the rear module is in position for attachment on the front module, the upper attachment brackets, formed by holding plates, fit into two of the side members of the corresponding front module retaining bracket.

15. The utility vehicle according to claim 8, wherein a plurality of stops and clips are welded at different levels to each of two vertical spars for lengthwise support and attachment of the rear module on the front module, outer plates of said stops and clips each exhibiting at least one through-hole and a seating surface projecting beyond the front module rear wall by a certain distance for attachment of the rear module to the front module by the vertical framework spars; and a thread plate having at least one threaded hole is floatingly mounted, and through-holes are provided in the vertical spars of the rear module bearer frame that are flush with the through-holes in the plural stops and clips when the rear module is in place for attachment on the front module, through which threaded screws are passed that are screwed into the threaded holes of the thread plates.

16. The utility vehicle according to claim 1, wherein one of the two side walls of the front module is longer than the opposite side wall, forming a rearward projecting alcove, the rearward projecting alcove having alcove walls and an alcove roof section.

17. The utility vehicle according to claim 16, wherein the rear module comprises a cutout large enough to accommodate the rearward projecting cab alcove when the front module joins with the rear module.

18. The utility vehicle according to claim 17, wherein the cab rear module, comprises a space configured to hold at least one of a spare wheel and an accompanying jack, the space bordered by at least one of a rear module side wall that is offset inwards from the side wall of the front module.

19. The utility vehicle according to claim 8, wherein the bearer frame of the rear module comprises:

two front vertical spars parallel to one another spaced to fit the front module supporting brackets, the two front vertical spars are joined at respective tops by a cross spar to form an open portal; and two parallel, rear vertical spars spaced from the front vertical spars that are joined by an upper cross spar and middle cross spar, form a rear module rear wall reinforcement, the rear vertical spars are joined to the front vertical spars by bottom longitudinal spars and upper longitudinal spars, whereby each spar array is reinforced internally by struts arranged in grid fashion, wherein the open portal comprises another bearer frame structure, having a plurality of spars, joined to the another bearer frame by a plurality of cross spars configured to reinforce the side wall of the rear module.

20. The utility vehicle according to claim 19, wherein the bottom longitudinal spars of the rear module bearer frame join a bottom end of the front vertical spars to point backwards and upwards forming an acute angle to the horizontal with their respective undersides forming the supporting brackets, said angle corresponding to that of the seating surfaces of the front module supporting brackets.

21. The utility vehicle according to claim 8, wherein a floor unit comprising the floor of the front module together with the longitudinal members and the supporting brackets attached to their ends and further brackets form an independent, fully prefabricated, and preassembled unit.

22. The utility vehicle according to claim 21, wherein a rear wall unit comprising the rear wall of the cab front module together with the framework spars reinforcing it, the retaining brackets, stops and clips attached to the spars and further mounting brackets form an independent, fully prefabricated, and preassembled unit.

23. The utility vehicle according to claim 22, wherein the floor unit and the rear wall unit, after their separate manufacture, are joined together and to the other front module walls and roof of the cab front module.

24. The utility vehicle according to claim 1, wherein the cab front module together with the armor and the cab rear module are each separately prefabricated and preassembled units that in final cab assembly can be joined at the readied points and then bolted together and unbolted.

* * * * *